United States Patent
Smith et al.

(10) Patent No.: US 12,040,504 B2
(45) Date of Patent: Jul. 16, 2024

(54) SYSTEM AND METHOD FOR DEPOSITING SEPARATOR MATERIAL

(71) Applicant: Millibatt, Inc., Los Angeles, CA (US)

(72) Inventors: Leland Smith, West Hollywood, CA (US); Janet Hur, Culver City, CA (US); Cheol Woong Lim, Foster City, CA (US); Guangyi Sun, San Diego, CA (US)

(73) Assignee: Millibatt, Inc., Los Angeles, CA (US)

( * ) Notice: Subject to any disclaimer, the term of this patent is extended or adjusted under 35 U.S.C. 154(b) by 0 days.

(21) Appl. No.: 18/134,501

(22) Filed: Apr. 13, 2023

(65) Prior Publication Data

US 2023/0335859 A1  Oct. 19, 2023

Related U.S. Application Data

(60) Provisional application No. 63/330,763, filed on Apr. 13, 2022.

(51) Int. Cl.
*H01M 50/403* (2021.01)
*H01M 10/0525* (2010.01)

(52) U.S. Cl.
CPC ..... *H01M 50/403* (2021.01); *H01M 10/0525* (2013.01)

(58) Field of Classification Search
None
See application file for complete search history.

(56) References Cited

U.S. PATENT DOCUMENTS

| 2018/0298492 A1* | 10/2018 | Arnepalli | H01L 21/0217 |
| 2020/0227725 A1* | 7/2020 | Joo | H01M 4/663 |
| 2022/0059875 A1* | 2/2022 | Sun | H01M 10/0583 |
| 2022/0102751 A1* | 3/2022 | Gerasopoulos | H01M 50/42 |

FOREIGN PATENT DOCUMENTS

CN  103258978 A  *  8/2013

OTHER PUBLICATIONS

International Search Report and Written Opinion for International Patent Application No. PCT/US23/18564 mailed on Jul. 6, 2023; 11 pages.
Notification of the International Application Number and of the International Filing Date for International Application No. PCT/US23/18564 mailed on May 3, 2023; 1 page.

* cited by examiner

*Primary Examiner* — Jose I Hernandez-Kenney
(74) *Attorney, Agent, or Firm* — Run8 Patent Group, LLC; Peter Miller

(57) ABSTRACT

One variation of the method includes: receiving a section of a substrate tape including a substrate within a coating zone; depositing a constellation of separator material droplets over the first substrate, each droplet in the constellation of separator material droplets including a first solvent, a first polymer, and a second polymer; heating the substrate and the proportion of the separator material to a first temperature; dissolving the second polymer out of the constellation of separator material droplets to render an open-celled network of pores by washing the constellation of separator material droplets and the substrate with a second solvent; and irradiating the constellation of separator material droplets to crosslink the first polymer and form a discrete separator layer with the open-celled network of pores sized to transport ions through the discrete separator layer.

20 Claims, 5 Drawing Sheets

SYSTEM AND METHOD FOR DEPOSITING SEPARATOR MATERIAL

CROSS-REFERENCE TO RELATED APPLICATIONS

This Application claims the benefit of U.S. Provisional Application No. 63/330,763, filed on 13 Apr. 2022, which is incorporated in its entirety by this reference.

This Application is related to U.S. patent application Ser. No. 17/407,109, filed on 19 Aug. 2021, which is incorporated in its entirety by this reference.

TECHNICAL FIELD

This invention relates generally to the field of battery technologies and more specifically to a new and useful system and method for depositing separator material in the field of battery technologies.

DESCRIPTION OF THE EMBODIMENTS

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. Method

Figure 1:
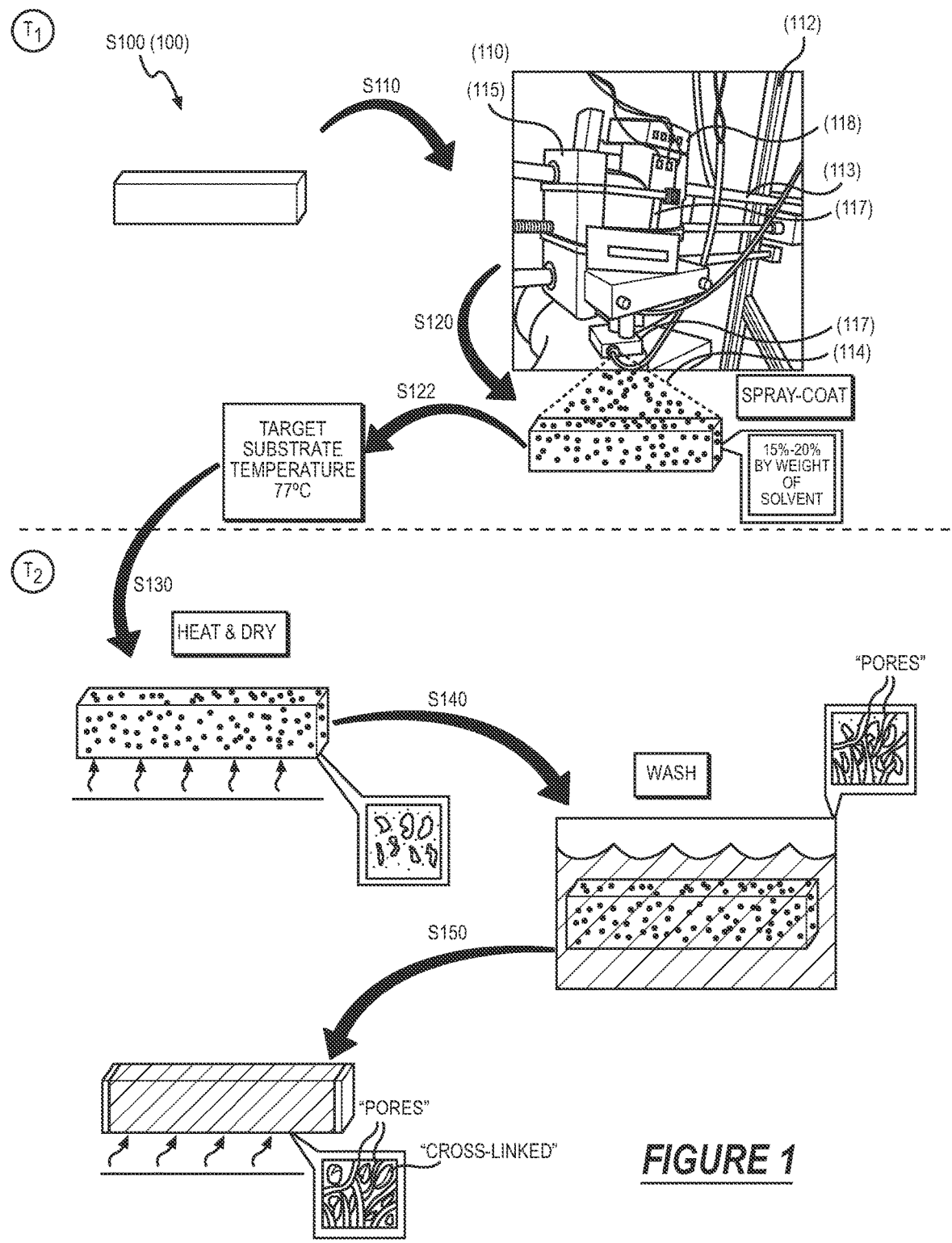
FIG. 1 is a flowchart representation of a method.
Figure 2:
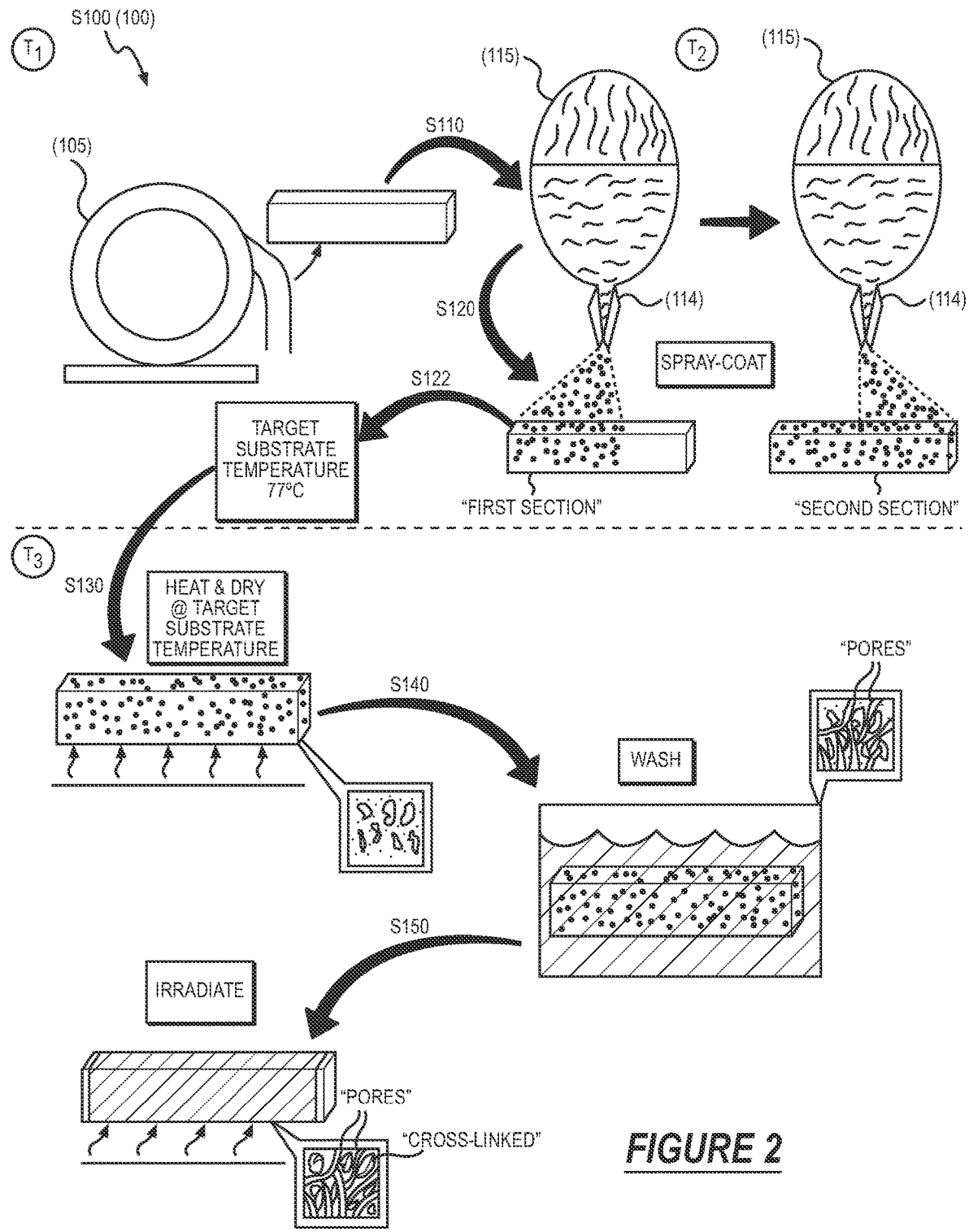
FIG. 2 is a flowchart representation of one variation of the method.
Figure 3:
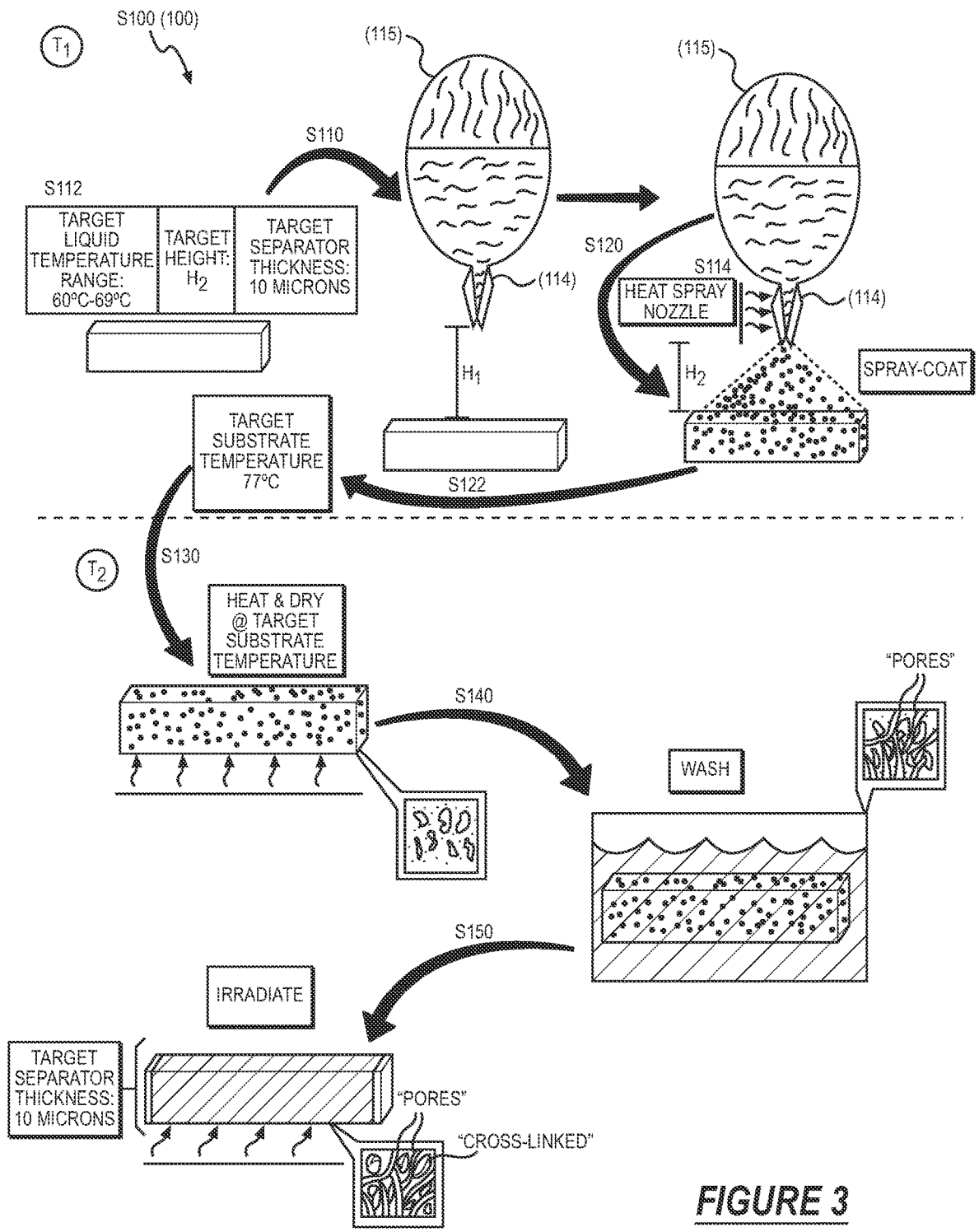
FIG. 3 is a flowchart representation of one variation of the method.
Figure 4:
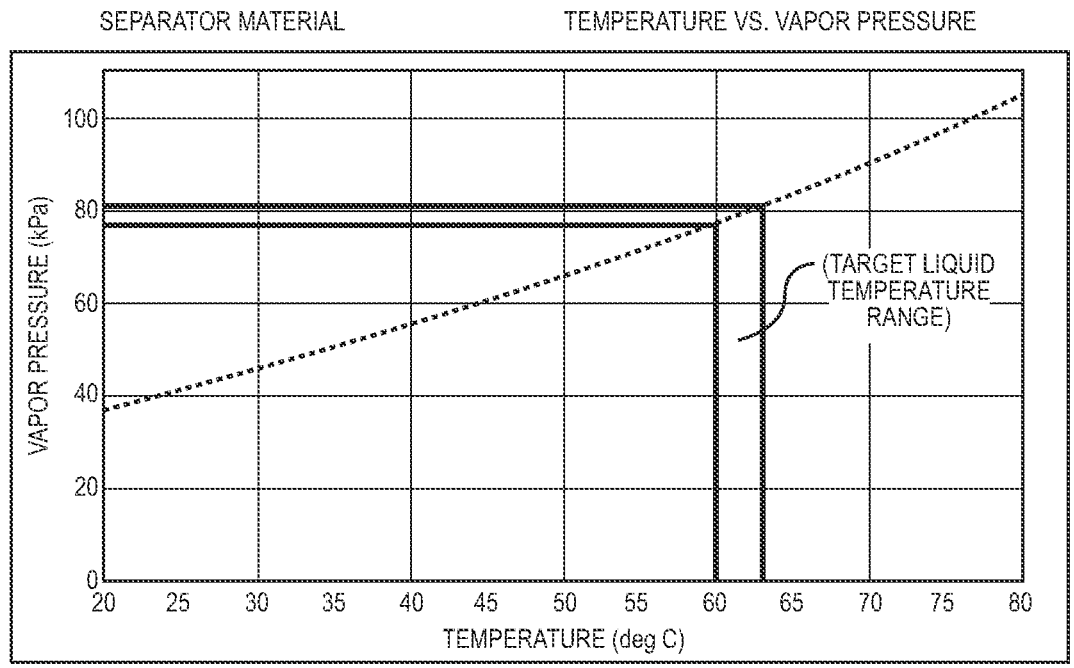
FIG. 4 is a flowchart representation of one variation of the method.
Figure 4:
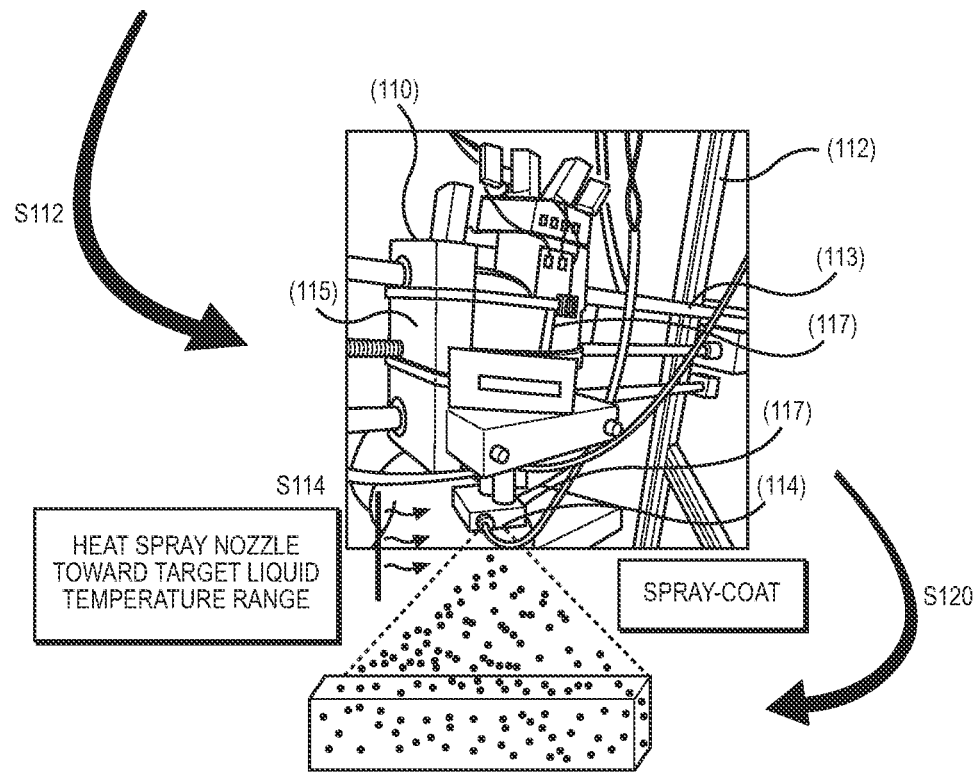
Figure 5:
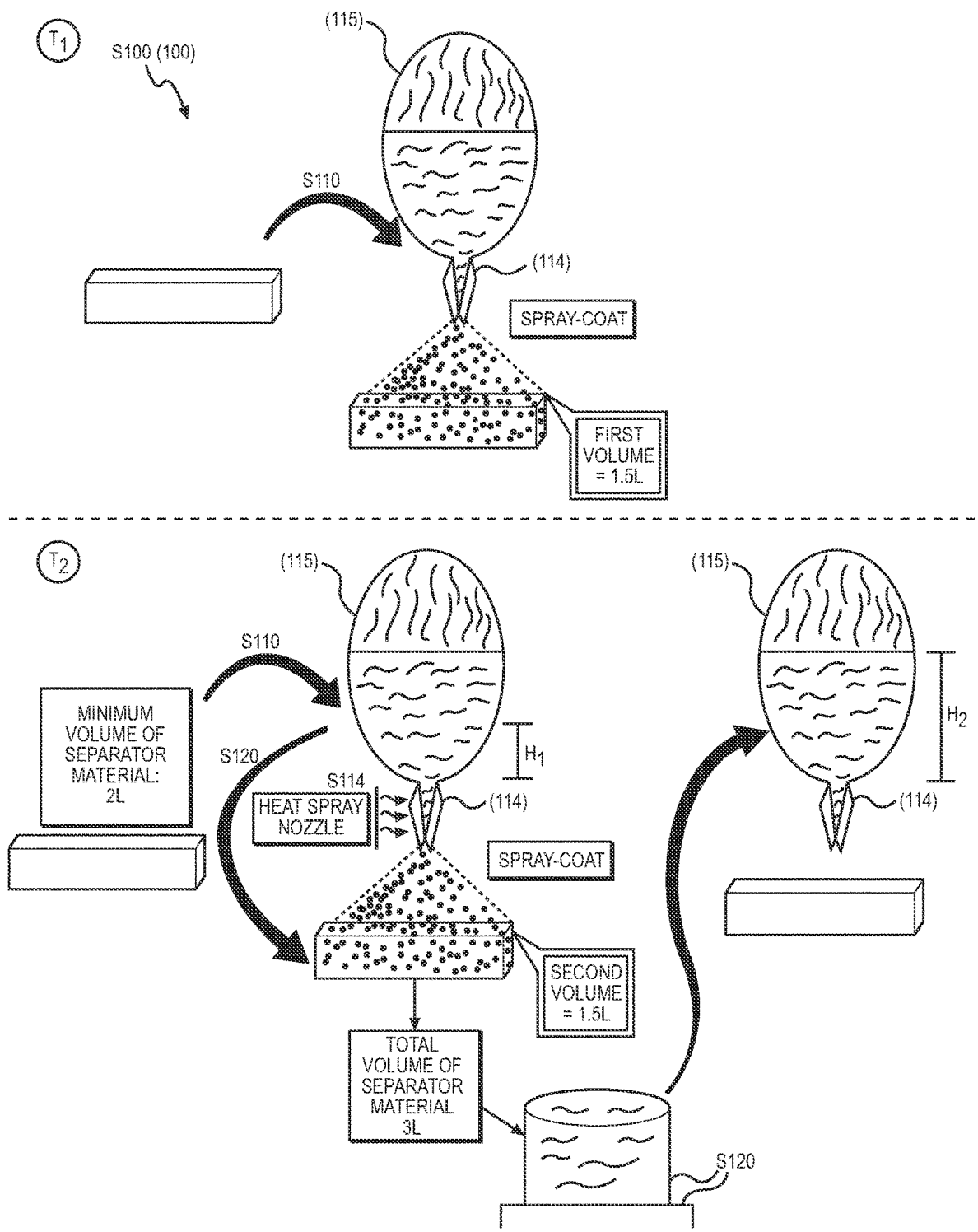
FIG. 5 is a flowchart representation of one variation of the method.

As shown in FIGS. 1-5, a method S100 includes, during a first time period: receiving a first substrate in a coating zone in Block S110; spray-coating a constellation of separator material droplets over the first substrate, each droplet in the constellation of separator material droplets including a first solvent, a first polymer miscible in the first solvent, and a second polymer miscible in the first solvent in Block S120; and accessing a target substrate temperature less than a boiling point of the first solvent in Block S122.

The method S100 also includes, during a second time period succeeding the first time period: heating the first substrate and the constellation of separator material droplets to the target substrate temperature to evaporate the first solvent out of the constellation of separator material droplets and promote phase-separation of the second polymer from the first polymer in Block S130; washing the constellation of separator material droplets with a second solvent to dissolve the second polymer out of the constellation of separator material droplets and render an open-celled network of pores within the constellation of separator material droplets in Block S140; and irradiating the constellation of separator material droplets and the first substrate to crosslink the first polymer and form a separator film on the first substrate, the separator film defining the open-celled network of pores sized to transport ions in Block S150.

1.1 Variation: Separator Thickness

One variation of the method S100 includes, during a first time period: receiving a substrate within a coating zone in Block S110; defining a target liquid temperature range of separator material in Block S112; at a spray nozzle facing the substrate and coupled to a reservoir volume of separator material in a liquid state, heating the spray nozzle toward the target liquid temperature range in Block S114; detecting a first temperature of separator material at the spray nozzle in Block S116; in response to the first temperature of the separator material falling within the target liquid temperature range, spray-coating a first volume of separator material including a first solvent, a first polymer miscible in the first solvent, and a second polymer miscible in the first solvent over the substrate via the spray nozzle in Block S120; and accessing a target substrate temperature less than a boiling point of the first solvent in Block S122.

This variation of the method S100 also includes, during a second time period succeeding the first time period: heating the substrate and the first volume of the separator material to the target substrate temperature to evaporate the first solvent out of the first volume of separator material in Block S130; dissolving the second polymer out of the first volume of separator material to render an open-celled network of pores in Block S140; and irradiating the first volume of separator material to crosslink the first polymer and form a separator film with a separator thickness approximating a target separator thickness in Block S150.

1.2 Variation: Discrete Separator

One variation of the method S100 includes, during a first time period: receiving a section of a substrate tape including a first substrate within a coating zone in Block S110; and depositing a constellation of separator material droplets over the first substrate, each droplet in the constellation of separator material droplets including a first solvent, a first polymer, and a second polymer in Block S120.

This variation of the method S100 includes, during a second time period succeeding the first time period: heating the first substrate and the constellation of separator material droplets to a first temperature in Block S130; washing the constellation of separator material droplets and the first substrate with a second solvent to dissolve the second polymer out of the constellation of separator material droplets and render an open-celled network of pores within the constellation of separator material droplets in Block S140; and irradiating the constellation of separator material droplets to crosslink the first polymer and form a discrete separator layer with the open-celled network of pores sized to transport ions through the discrete separator layer in Block S150.

2. Applications

Generally, a substrate supply station, a spray-coating system, a refill station, a washing station, and an irradiation station (hereinafter "the system 100") can cooperate to execute Blocks of the method S100 to deposit separator material as an aerosol (or a "constellation," "mist," or "cloud" of separator material droplets) over a substrate (e.g., electrode, cathode, anode) and to form a thin separator film (e.g., discrete separator layer, permeable separator membrane) of uniform thickness on the substrate.

More specifically, the separator material includes a homogeneous polymer-polymer-solvent liquid mixture including: a first solvent; a first polymer miscible in the first solvent;

and a second polymer miscible in the first solvent. In one example: the first solvent includes an organic ketone such as butanone; the first polymer includes a co-polymer such as poly(vinylidene fluoride-hexafluoropropylene) (or "PVDF-HFP"); and the second polymer includes a polyether such as polyethylene oxide (or "PEO"), poly(oxyethylene) (or "POE"), or polyethylene glycol (or "PEG"). In this example, the first polymer (e.g., PVDF-HFP) and the second polymer (e.g., PEG) are mixed in the first solvent (e.g., butanone) to form a homogenous polymer-polymer-solvent liquid mixture exhibiting greater than 80% by weight of the first solvent.

Accordingly, the system 100 can execute Blocks of the method S100 during a processing cycle to: spray-coat a volume of separator material over a substrate; heat the substrate to rapidly dry the volume of separator material upon contact with the substrate and to evaporate the first solvent (e.g., butanone) out of the volume of separator material; dissolve the second polymer (e.g., PEG) out of the volume of separator material by washing or rinsing the substrate in a chemical bath of a second solvent including an alcohol (e.g., isopropanol) to render an open-celled network of pores; and irradiate the volume of separator material with an electron beam to further crosslink the first polymer (e.g., PVDF-HFP) and form a separator film of uniform thickness and that defines an network of open-celled pores sized to transport ions (e.g., lithium ions) through the separator film.

Additionally, the system 100 can further monitor the temperature of separator material in a gaseous environment within a vessel and in the liquid state within a reservoir of the coating supply subsystem to maintain a target vapor pressure and a homogeneous polymer-polymer-solvent liquid mixture within the reservoir. Additionally, the system 100 can leverage the target temperature ranges and the target vapor pressure of the separator material: to achieve an accurate and repeatable liquid flow rate of the separator material through a spray nozzle of the spray-coating system; and to thus achieve an accurate and repeatable separator material thickness over the substrate via spray-coating during the processing cycle. The system 100 can also define (or access) and implement time and temperature parameters of a drying segment of the processing cycle to evaporate the first solvent (e.g., butanone) out of the separator material coating the substrate and to control phase separation of the first polymer (e.g., PVDF-HFP) from the second polymer (e.g., PEG).

Additionally or alternatively, the system 100 can: irradiate the volume of separator material to form a porous electrolyte structure that extends beyond a perimeter of a substrate; and then fill the network of open-celled pores with solvated ions to form an electrolyte. For example, the system 100 can execute Blocks of the method to form an ion-carrying (e.g., a lithium-ion-carrying) electrolyte over a cathode and/or an anode, which can then be assembled into a battery cell of a two-dimensional battery or a three-dimensional battery (e.g., for an electric vehicle, a wearable device, a cellular device, or a battery-operated tool). Furthermore, the electrolyte can function as a buffer or electrode separator between an anode and a cathode—assembled into a battery cell—in order to prevent flow of electrons between the anode and the cathode inside the battery cell and thus prevent electrical shorts within the battery.

The method S100 is described below as executed by the system 100 to: deposit (e.g., spray-coat) separator material over a substrate (e.g., an electrode); and to form a thin film of separator material, or a discrete separator layer, or a permeable separator membrane on the substrate via a processing cycle. However, the method S100 can be similarly implemented to produce a thin film of separator material, a discrete separator layer, or a permeable separator membrane directly over a cathode and/or an anode and/or to produce a separate, continuous non-conductive structure for subsequent assembly with an anode and a cathode to form a two-dimensional or three-dimensional battery, etc.

3. System

The system 100 includes: a substrate supply station 105; a spray-coating system 110; a refill station 120; a washing station 130; and an irradiation station 140. The substrate supply station 105 includes a substrate reel (e.g., electrode reel, anode reel, cathode reel) configured to convey a substrate tape including a series of substrates to the spray-coating system 110. The spray-coating system 110 includes: a chassis 112; a multi-axis stage 113; a spray nozzle 114 and a coating supply subsystem 115 configured to selectively supply separator material in a liquid state (e.g., polymer-polymer-solvent liquid mixture) from a reservoir to the spray nozzle 114; a gas regulator 116; a set of heaters 117; and a set of temperature sensors 118. The spray-coating system 110 is configured to spray-coat volumes of the separator material onto a substrate.

The refill station 120 includes a new supply of separator material (e.g., polymer-polymer-solvent liquid mixture) and is configured to refill the reservoir of the spray-coating system with this new supply of separator material. The washing station 130 includes a chemical bath of a second solvent such as an alcohol (e.g., isopropanol) and is configured to dissolve a second polymer out of the separator material on the substrate. The irradiation station 140 includes an electron beam configured to transport electrons toward the substrate to crosslink the first polymer and form a separator film (e.g., discrete separator layer, permeable separator membrane) on the substrate.

3.1 Substrate Supply Station

In one implementation, the substrate supply station 105 includes a substrate reel (e.g., electrode reel, anode reel, cathode reel) configured to convey a substrate tape including a series of substrates to the spray-coating system 110. In particular, the substrate supply station 105 includes a substrate reel configured to convey a cathode tape including a series of cathodes and/or an anode tape including a series of anodes from the substrate supply station to the spray-coating system 110.

In one variation, the system 100 can trigger the substrate supply station 105 to load a cathode tape onto the substrate reel and convey the cathode reel including a first cathode, in the series of cathodes, from the substrate supply station to the coating zone within the spray-coating system 110. The system 100 can then receive a first section of the cathode tape including a first cathode within the coating zone and implement methods and techniques described below to spray-coat separator material over the first cathode occupying the coating zone, dry the separator material on the first cathode, wash the first cathode with an alcohol bath, and irradiate the separator material and the first cathode with an electron beam to form a separator film on the first cathode in the first section of the cathode tape.

Additionally or alternatively, the system 100 can trigger the substrate supply station 105 to load an anode tape onto the substrate reel and convey the anode reel including a first anode, in the series of anodes, from the substrate supply station to the coating zone within the spray-coating system 110. The system 100 can then receive a first section of the anode tape including a first anode within the coating zone and implement methods and techniques described below to spray-coat separator material over the first anode occupying the coating zone, dry the separator material on the first anode, wash the first anode with an alcohol bath, and irradiate the separator material and the first anode with an electron beam to form a separator film on the first anode in the first section of the anode tape.

The system 100 can repeat these methods and techniques for each other cathode in the series of cathodes, for each other anode in the series of anodes, and for each other section of substrate tape to convey the substrate tape (e.g., cathode tape, anode tape) to the spray-coating system 110.

3.1 Spray-Coating System

The spray-coating system 110 includes: a chassis 112; a multi-axis stage 113; a coating supply subsystem 115; a gas regulator 116; a set of heaters 117; and a set of temperature sensors 118 coupled to the coating supply subsystem 115.

The chassis 112 defines a coating zone and is arranged about the spray-coating system 110. The multi-axis stage 113 is configured to support the coating supply subsystem 115. The coating supply subsystem 115 is supported by the multi-axis stage 113 and includes: a vessel configured to contain a gaseous environment above a reservoir configured to contain the separator material in a liquid state (e.g., polymer-polymer-solvent liquid mixture); a first heater 117 configured to heat the reservoir of separator material in the liquid state; a spray nozzle 114 coupled to the reservoir, facing a substrate, and configured to spray-coat a volume of the separator material from the reservoir over a substrate; a second heater 117 coupled to the spray nozzle 114 and configured to heat the separator material prior to spray-coating the substrate; and a valve interposed between the reservoir and the spray nozzle 114.

The gas regulator 116 is coupled to the coating supply subsystem and is configured to adjust a pressure of gas within the vessel of the coating supply subsystem 115. In one variation, the gas regulator 116 can increase pressure of gas within the vessel and through the spray nozzle 114 to remove excess separator material that may collect within the spray nozzle 114 over a period of time (e.g., one week, three weeks, one month).

The temperature sensors 118 can include a set of temperature sensors 118 configured to output signals corresponding to temperatures of the separator material at the reservoir, temperatures of the separator material at the spray nozzle 114, and temperatures of the substrate.

3.1.1 Chassis+Gantry

The chassis 112: defines a coating zone and is arranged about the spray-coating system 110. The chassis 112 is configured to: support the multi-axis stage and the coating supply subsystem 115.

The multi-axis stage 113 includes a three-axis gantry (e.g., X-, Y-, and Z-axes): supported by the chassis 112; arranged over a substrate occupying a coating zone; configured to face (e.g., is arranged over, under, or adjacent) one side of the substrate; and configured to support the coating supply subsystem 115 over a range of vertical, lateral, and longitudinal positions to enable the spray nozzle 114 to access edges of the substrate (e.g., electrode) during a processing cycle.

In one variation, the multi-axis stage includes a five-axis gantry (e.g., X-, Y-, Z-, A-, and B-axes): supported by the chassis 112; arranged over a substrate occupying the coating zone; configured to face one side of the substrate; and configured to support the coating supply subsystem 115 over a range of vertical, lateral, longitudinal, and rotational positions to enable the spray nozzle 114 to access edges of the substrate (e.g., electrode) during the processing cycle.

3.1.2 Coating Supply Subsystem

The coating supply subsystem 115 is supported by the multi-axis stage 113 and includes: a vessel configured to contain a gaseous environment of separator material; a reservoir arranged in the vessel and configured to contain separator material in a liquid state; a spray nozzle 114 coupled to the reservoir and facing the substrate; a first heater 117 configured to heat the separator material; a second heater 117 coupled to the spray nozzle 114 and configured to heat the separator material prior to spray-coating the substrate; a first valve interposed between the reservoir and the spray nozzle 114; and a second valve arranged proximal the spray nozzle 114.

The first valve is operable in an open position to supply separator material in the liquid state from the reservoir to the spray nozzle 114 and in a closed position to maintain the separator material in a liquid state within the reservoir and in a gaseous environment in the vessel. The second valve is operable in a closed position to prevent an extant volume of the first solvent (e.g., butanone) from entering the spray nozzle 114 and in an open position to supply the extant volume of first solvent (e.g., butanone) through the spray nozzle 114 and thereby, enable cleaning of the spray nozzle 114 without disassembling the coating supply subsystem 115.

3.1.3 Temperature Sensors

In one implementation, the spray-coating system 110 includes a set of temperature sensors 118 (e.g., PID sensors, thermocouples) coupled to the coating supply subsystem 115 and/or a substrate occupying the coating zone. These temperature sensors 118 are configured to output signals corresponding to temperatures of the separator material during a processing cycle.

In one variation, the system 100 can include: a first temperature sensor 118 coupled to the vessel and configured to output signals corresponding to temperatures of the separator material in the gaseous environment; a second temperature sensor 118 coupled to the spray nozzle 114 and configured to output signals corresponding to temperatures of the separator material in the liquid state prior to exiting the spray nozzle 114; and a third temperature sensor 118 coupled to the spray-coating system 110 and configured to output signals corresponding to temperatures of the substrate. The system 100 can then: interpret a temperature of the separator material and/or the substrate; monitor this temperature; and derive correlations between this temperature and the vapor pressure of the gaseous environment prior to initiating a coating segment of the processing cycle, as further described below.

4. Separator Material: Polymer-Polymer-Solvent Liquid Mixture

Generally, the separator material is a polymer-polymer-solvent liquid mixture and includes: a first solvent; a first polymer miscible in the first solvent; and a second polymer miscible in the first solvent. The polymer-polymer-solvent liquid mixture is greater than 80% by weight of the first solvent and includes a low viscosity to enable the spray nozzle to deposit a constellation of separator material droplets (e.g., aerosol) over a porous substrate and to adhere to a surface of the porous substrate.

In one implementation, the first solvent includes an organic ketone such as butanone characterized by a boiling point of 79.64 degrees Celsius or 175.26 degrees Fahrenheit. The first polymer includes a co-polymer such as poly (vinylidene fluoride-hexafluoropropylene) (or "PVDF-HFP") and is characterized by a molecular weight of approximately 400,000 grams per mol. The second polymer includes a polyether such as polyethylene oxide (or "PEO"), poly(oxyethylene) (or "POE"), or polyethylene glycol (or "PEG") and is characterized by a molecular weight of approximately 20,000 grams per mol. In this implementation, the first polymer (e.g., PVDF-HFP) and the second polymer (e.g., PEG) are mixed in the first solvent (e.g., butanone) to form a homogenous polymer-polymer-solvent liquid mixture exhibiting greater than 80% by weight of the first solvent.

In one variation, the polymer-polymer-solvent liquid mixture includes the first solvent (e.g., butanone) with the first polymer (e.g., PVDF-HFP) and the second polymer (e.g., PEG) mixed in the first solvent. In this variation, the system 100 can heat the polymer-polymer-solvent liquid mixture toward a target liquid temperature range to maintain the polymer-polymer-solvent liquid mixture as a homogenous mixture within the reservoir and at the spray nozzle of the coating supply subsystem. Additionally, the first polymer (e.g., PVDF-HFP) is immiscible in the second polymer (e.g., PEG) and vice versa.

Furthermore, during a processing cycle, the system 100 spray-coats the polymer-polymer-solvent liquid mixture as an aerosol (or a "constellation," "mist," or "cloud" of separator material droplets) over a substrate occupying the coating zone. For example, the polymer-polymer-solvent liquid mixture can exhibit less than 20% by weight of the first solvent (e.g., between 15% and 20% by weight of butanone). The system 100 further rapidly dries the constellation of separator material droplets, such as with a heater coupled to the substrate, upon initial contact between the constellation of separator material droplet and the substrate, thereby promoting phase separation of the first polymer (e.g., PVDF-HFP) and the second polymer (e.g., PEG). The system 100 then dissolves the second polymer (e.g., PVDF-HFP) out of the constellation of separator material droplets with a volume of a second solvent, such as washing, rinsing, or spraying the substrate with an alcohol (e.g., isopropanol). The resulting constellation of separator material droplets—with the second polymer removed—can thus form a continuous film (e.g., aerogel) defining a network of voids distributed throughout its volume.

The system 100 then selectively irradiates the constellation of separator material droplets and the substrate via an electron beam, to further crosslink molecules of the first polymer (e.g., PVDF-HFP) and form a separator film (e.g., discrete separator layer, permeable separator membrane) across the substrate. The separator film thus defines the open-celled network of pores that are sized to: promote uniform and rapid ion transport; to prevent defect formation on the substrate; and to thus prevent electrical shorts between the substrate and an anode or a cathode in a battery cell, such as due to dendrite growth from the anode into the separator film, as further described below.

5. Processing Cycle

At the start of a processing cycle (e.g., spray deposition cycle, spray processing cycle), the system 100 resets the multi-axis stage to a home position facing the coating zone. The substrate supply station then conveys a series of substrates (e.g., anodes, cathodes) to the spray-coating system such that a substrate (e.g., an anode, a cathode) occupies the coating zone. The system 100 then initiates the processing cycle (e.g., spray deposition cycle, spray processing cycle).

The system 100 washes or rinses the substrate with the second solvent to dissolve the second polymer out of the separator material, thereby rendering an open-celled network of pores. The system 100 then irradiates the separator material and the substrate with an electron beam to further crosslink the first polymer and form a separator layer. The resulting separator layer is non-conductive and includes the open-celled network of pores sized to transport ions (e.g., lithium ions) through the separator layer and between adjacent anode and cathodes within an assembled battery cell.

5.1 Coating Segment

Once the system 100 initiates the processing cycle, the system 100 can trigger the multi-axis stage to locate the coating supply subsystem facing the substrate within the coating zone and initiate a first coating segment of the processing cycle.

Prior to initiating the first coating segment of the processing cycle, the system 100 can access a target gas temperature range of separator material for the gaseous environment in the vessel, a target liquid temperature range of separator material in the liquid state at the spray nozzle, and a target substrate temperature for the substrate for the drying segment of the processing cycle. Then, during the first coating segment of the processing cycle, the system 100 can deposit (or "spray-coat") a volume of the separator material as an aerosol (or "a constellation of separator material droplets") across all surfaces and/or edges of a substrate (e.g., an anode, a cathode) occupying the coating zone via the spray nozzle.

In particular, the system 100 can: configure the valve arranged within the coating supply subsystem to an open position to convey the separator material (e.g., polymer-polymer-solvent liquid mixture) in the liquid state from the reservoir to the spray nozzle; and spray-coat a constellation of separator material droplets over the substrate within the coating zone such that each droplet in the constellation of separator material droplets contains molecules of the first polymer (e.g., PVDF-HFP) defining a minor cross-sectional width: greater than a minimum cross-sectional width of lithium ions; and less than a minimum cross-sectional width of a substrate thickness (e.g., 50 microns, 100 microns). Thus, the constellation of separator material droplets can encapsulate edges of the substrate (e.g., anode, cathode). Furthermore, the system 100 can spray-coat a constellation of separator material droplets over a substrate, each droplet in the constellation of separator material droplets including a first solvent (e.g., butanone), a first polymer (e.g., PVDF-HFP) miscible in the first solvent and a second polymer (e.g., PEG) miscible in the first solvent in Block S120.

Furthermore, the system 100 can detect a minimum volume of separator material in the liquid state within the reservoir and track the volumes of separator material exiting the spray-nozzle for each coating segment of the processing cycle. The system 100 can then derive a correlation between the total volume of separator material exiting from the spray nozzle for each coating segment and in response to the total volume of separator material exceeding the minimum volume of separator material, trigger the refill station to refill the reservoir with a new volume of separator material.

5.1.1 Separator Material Temperature+Pressure Regulation

Prior to spray-coating separator material over the substrate occupying the coating zone, the system 100 can define a target gas temperature range of the first solvent for the gaseous environment of the vessel and a target liquid temperature range of separator material for the reservoir, which yields a target flow rate of separator material through the spray nozzle. The system 100 can then monitor the temperature of separator material in the vessel and the reservoir based on signals from the set of temperature sensors coupled to the coating supply subsystem. Furthermore, the system 100 can adjust the temperature of the gaseous environment and the separator material to the target temperature ranges with the heater coupled to the coating supply subsystem and the spray nozzle to maintain the target flow rate of the separator material through the spray nozzle.

In one implementation, the system 100 can define a target gas temperature range corresponding to a target vapor pressure of the first solvent in a gaseous environment within the vessel. In particular, the system 100 can: access a target gas temperature range proportional to the vapor pressure of the separator material (e.g., polymer-polymer-solvent liquid mixture) in the gaseous environment within the vessel; detect a temperature of the first solvent in the gaseous environment; and initiate the coating segment of the processing cycle based on this temperature.

For example, the system 100 can: define a target gas temperature range of the first solvent; at the vessel containing the gaseous environment above the reservoir of separator material in the liquid state, heat the gaseous environment toward the target gas temperature range; and interpret a first temperature of the gaseous environment within the vessel based on a first signal from a first temperature sensor coupled to the coating supply subsystem. Then, in response to the first temperature of the gaseous environment falling within the target gas temperature range, the system 100 can initiate the coating segment of the processing cycle and spray-coat a constellation of separator material droplets through the spray nozzle and over the substrate.

In another implementation, the system 100 can similarly define a target liquid temperature range of separator material to maintain the homogenous polymer-polymer-solvent liquid mixture within the reservoir; detect a temperature of separator material in the liquid state at the spray nozzle; and initiate the coating segment of the processing cycle based on this temperature. For example, the system 100 can: define a target liquid temperature range of separator material; at the spray nozzle coupled to the reservoir of separator material in the liquid state and facing the substrate, heat the spray nozzle toward the target liquid temperature range; and interpret a first temperature of separator material at the spray nozzle based on a signal from a temperature sensor coupled to the coating supply subsystem. Then, in response to the first temperature of the separator material falling within the target liquid temperature range, the system 100 can initiate the coating segment of the processing cycle and spray-coat the constellation of separator material droplets over the substrate via the spray nozzle.

Additionally, the system 100 can define the target gas temperature range of the first solvent equivalent to the target liquid temperature range of separator material, detect temperatures of separator material in the liquid state at the spray nozzle and in the gaseous environment, and then initiate the coating segment of the processing cycle based on these temperatures of separator material in the liquid state and the first solvent in the gaseous environment. For example, the system 100 can: define a target gas temperature range—corresponding to a target vapor pressure of separator material in a gas state—of the first solvent; at the vessel containing the gaseous environment above the reservoir of separator material in the liquid state, heat the gaseous environment toward the target gas temperature range; interpret a first temperature of the gaseous environment based on a first signal from a first temperature sensor coupled the coating supply subsystem; define a target liquid temperature range of separator material; at the spray nozzle coupled to the reservoir of separator material in the liquid state and facing the substrate, heat the spray nozzle toward the target liquid temperature range; and interpret a second temperature of separator material in the liquid state at the spray nozzle based on a second signal from a second temperature sensor coupled the coating supply subsystem. Then, in response to the first temperature of the gaseous environment falling within the target gas temperature range and in response to the second temperature of the separator material falling within the target liquid temperature range, the system 100 can spray-coat the constellation of separator material droplets over the substrate via the spray nozzle.

Alternatively, in response to the first temperature of the gaseous environment falling outside of the target gas temperature range and in response to the second temperature of the separator material falling outside of the target liquid temperature range, the system 100 can: heat the gaseous environment toward the target gas temperature range via the first heater coupled to the vessel; heat the separator material in the liquid state toward the target liquid temperature range via the second heater coupled to the spray nozzle; interpret a third temperature of the gaseous environment based on a signal from the first temperature sensor; and interpret a fourth temperature of separator material in the liquid state at the spray nozzle based on a signal from the second temperature sensor. Then, in response to the third temperature of the gaseous environment falling within the target gas temperature range and in response to the fourth temperature of the separator material falling within the target liquid temperature range, the system 100 can spray-coat the constellation of separator material droplets over the substrate via the spray nozzle.

Therefore, the system 100 can monitor the temperature of the first solvent in the gaseous environment and in the liquid state to maintain a target vapor pressure and a homogeneous polymer-polymer-solvent liquid mixture within the reservoir. Additionally, the system 100 can leverage the target temperature ranges and the target vapor pressure to achieve an accurate and repeatable flow rate of the separator material through the spray nozzle to spray-coat separator material over the substrate during the coating segment of the processing cycle.

5.1.2 Separator Thickness

In one implementation, the system 100 can trigger the multi-axis stage to locate the spray nozzle of the spray-coating system at a target offset distance relative the substrate within the coating zone. More specifically, the system 100 can receive a target separator thickness for the separator film (e.g., discrete separator layer, permeable separator membrane)—formed during irradiation of the constellation of separator material droplets—and select a target offset distance between the spray nozzle and the substrate proportional to the target separator thickness.

In one variation, the system 100 can set the target offset distance of the spray nozzle according to a battery specification (e.g., multi-cell battery for an electric vehicle, single-cell battery for a wearable device) and corresponding mechanical, electrical, optical, and/or physical properties for the separator film formed on the substrate (e.g., anode, cathode).

For example, a user may require a separator film with a target separator thickness for a multi-cell battery for an electric vehicle and define a battery specification for this multi-cell battery that exhibits low resistance, greater ion flux, a target conductivity, and a high mechanical strength to withstand applied forces during subsequent assembly into a battery cell. The system 100 can then: receive the battery specification defining the target separator thickness for the separator film (e.g., 10 microns); select a target offset distance for the spray nozzle relative the substrate based on the target separator thickness; and detect a first distance between the spray nozzle and the substrate within the coating zone by interpreting a signal from a depth sensor coupled to the coating supply subsystem. Then, in response to the target offset distance exceeding the first distance between the spray nozzle and the substrate, the system 100 can: trigger the multi-axis to adjust the spray nozzle from the first distance to the target offset distance; and spray-coat the constellation of separator material droplets over a first section of the substrate via the spray nozzle at the target offset distance. The system 100 can then spray-coat a second constellation of separator material droplets over a second section of the substrate and implement methods and techniques described below to form a separator film—exhibiting low resistance, greater ion flux, and a high mechanical strength—with a separator thickness approximating the target separator thickness (e.g., 10 microns+/−0.01 microns, 10 microns+/−0.1 microns).

Therefore, the system 100 can spray-coat discrete sections or segments of the substrate with separator material via the spray nozzle—located at a target offset distance from the substrate—in order to form a thin separator film of a target separator thickness according to a particular battery specification, such as defined by an operator.

5.1.3 Refill Reservoir with Separator Material

In one implementation, the system 100 can detect a minimum volume of separator material in the liquid state within the reservoir and track the volumes of separator material exiting the spray-nozzle for each coating segment of the processing cycle in order to trigger the refill station to refill the reservoir with a new volume of separator material.

For example, during a first coating segment of the processing cycle, the system 100 can: detect a minimum volume of separator material in the liquid state in the reservoir; receive a first substrate within the coating zone; define a target liquid temperature range of separator material in a liquid state in the reservoir; detect a first temperature of the separator material at the spray nozzle; and, in response to the second temperature of the separator material falling within the target liquid temperature range, spray-coat a first volume of separator material over the first substrate via the spray nozzle. Then, during a second coating segment of the processing cycle, the system 100 can: receive a second substrate within the coating zone; heat the spray nozzle toward the target liquid temperature range; detect a second temperature of separator material at the spray nozzle; and, in response to the second temperature of the separator material falling within the target liquid temperature range, spray-coat a second volume of separator material over the second substrate via the spray nozzle. The system 100 can then: calculate a total volume of separator material on the first substrate and the second substrate based on a combination of the first volume of separator material and the second volume of separator material; and, in response to the minimum volume of separator material exceeding the total volume of separator material, refill the reservoir with a third volume of separator material in the liquid state greater than the minimum volume of separator material.

Therefore, the system 100 can track volumes of separator material exiting the spray nozzle during each coating segment of the processing cycle and refill the volume of separator material in the liquid state in the reservoir if the minimum volume of separator material exceeds the total volume of separator material exiting the spray nozzle.

5.2 Drying Segment: Removal of First Solvent+Phase Separation

During a second drying segment of the processing cycle, the system 100 can rapidly and concurrently dry each separator material droplet in the constellation of separator material droplets upon contact with the substrate. Furthermore, the system 100 can heat the substrate and the constellation of separator material droplets to a temperature within a target temperature range proportional to the boiling point of the first solvent for a duration of time. During the drying segment, the system 100 can also evaporate the first solvent out of each droplet in the constellation of separator material droplets and promote phase separation of the second polymer (e.g., PEG) and the first polymer (e.g., PVDF-HFP) on the substrate.

In one implementation, the system 100 can set time and temperature parameters of the drying segment of the processing cycle to control phase separation of the first polymer (e.g., PVDF-HFP) and the second polymer (e.g., PEG). In particular, the system 100 can access a target substrate temperature range proportional to the boiling point of the first solvent (e.g., butanone) in Block S122. The system 100 can then heat the substrate and the constellation of separator material droplets for a duration of time (e.g., 10 seconds, 30 seconds) to evaporate the first solvent out of the separator material in Block S130. More specifically, the system 100 can access the target substrate temperature range such as between 74 degrees Celsius and 79 degrees Celsius; between 77 degrees Celsius and 79 degrees Celsius; and/or between 78.9 degrees Celsius and 79.4 degrees Celsius etc. Then, the system 100 can initiate the drying segment of the processing cycle and heat the constellation of separator material droplets and the substrate to a temperature within the target substrate temperature range.

For example, the system 100 can spray-coat a constellation of separator material droplets over the substrate during a coating segment of the processing cycle. In this example, each droplet in the constellation of separator material droplets includes: the first solvent including a first volume of an organic ketone solvent (e.g., butanone); the first polymer miscible in the first volume of the organic ketone solvent and including a second volume of a co-polymer (e.g., PVDF-HFP); and the second polymer miscible in the first volume of the organic ketone solvent and including a third volume of a polyether (e.g., PEG). The system 100 can then: access the target substrate temperature less than the boiling point of the organic ketone solvent (e.g., between 77 degrees Celsius and 79 degrees Celsius); initiate the drying segment of the processing cycle; and heat the substrate and the constellation of separator material droplets to a temperature (e.g., 78 degrees Celsius) within the target substrate temperature range via the heater coupled to the substrate to evaporate the first volume of the organic ketone solvent (e.g., butanone) out of the constellation of separator material droplets and to promote phase-separation of the second polymer (e.g., PEG) from the first polymer (e.g., PVDF-HFP).

However, the constellation of separator material and the substrate can be processed during the second drying segment of the processing cycle for any other duration of time or at any other temperature.

The system 100 can then convey the substrate to the washing assembly to wash or rinse the constellation of separator material droplets with a second solvent to dissolve the second polymer out of the constellation of separator material droplets, and thereby render an open-celled network of pores.

5.3 Washing Segment: Removal of Second Polymer

During a third washing segment of the processing cycle, the system 100 can dissolve the second polymer (e.g., PEG) out of the constellation of separator material droplets to render an open-celled network of pores by washing or rinsing the constellation of separator material droplets with a chemical bath containing a second solvent (e.g., alcohol). Furthermore, the system 100 can wash the substrate and the constellation of separator material droplets with a second solvent in Block S140 in order to form an open-celled network of pores distributed throughout the constellation of separator material droplets.

In one implementation, the system 100 can receive the constellation of separator material droplets—each droplet including a first volume of a first polymer (e.g., PVDF-HFP), and a second volume of a second polymer (e.g., PEG)—and the substrate in the washing station from the spray-coating system. At the washing station, the system 100 can then dissolve the second volume of the second polymer (e.g., PEG) out of the constellation of separator material droplets to render the open-celled network of pores by washing the constellation of separator material droplets with the second solvent including a third volume of an alcohol (e.g., isopropanol), which may fully swell the substrate, dissolve away the second polymer (e.g., PEG) from pores in the separator material to render open channels for ion transport through the separator material.

In one variation, the system 100 can execute Blocks of the method S100 to rinse the constellation of separator material droplets and the substrate with the second solvent (e.g., isopropanol) to render an open-celled network of pores; and project a stream of air over the constellation of separator material droplets and the substrate to remove excess isopropanol, remaining from the chemical bath, from the constellation of separator material droplets and the substrate. For example, the substrate can be immersed in a heated bath of the second solvent (e.g., isopropanol) and agitated for a duration of time, removed from the bath, and dried in order to remove the second polymer (e.g., PEG) from the separator material.

Furthermore, the system 100 can then convey the substrate to the irradiation station, which then irradiates the constellation of separator material droplets over the substrate, thereby promoting crosslinking of the first polymer (e.g., PVDF-HFP) to form the separator film with the open-celled network of pores.

5.4 Irradiating Segment: Thin Film

During a fourth irradiating segment of the processing cycle, the system 100 can irradiate the constellation of separator material droplets and the substrate to crosslink the first polymer and form a separator film (e.g., discrete separator layer, permeable separator membrane) on the substrate with the open-celled network of pores sized to transport ions through the separator film in Block S150. In particular, the system 100 can selectively expose the substrate to an electron beam in order to further crosslink molecules within the first polymer (e.g., PVDF-HFP) and form the separator film.

In one implementation, the irradiation station includes an electron beam configured to transport electrons toward the constellation of separator material droplets and the substrate to crosslink molecules within the first polymer (e.g., PVDF-HFP) to form a polymer matrix, to flash dry any remaining solvent from the substrate, and to form a separator film on the substrate.

In one variation, the system 100 can receive a first substrate including a cathode at the irradiation station and then receive a second substrate including an anode at the irradiation station from the washing station. In this variation, the system 100 can receive the cathode and the anode with the second polymer (e.g., PEG) removed from the constellation of separator material droplets; and transport electrons toward the cathode and the anode via the electron beam to form a continuous non-conductive structure extending beyond perimeters of the cathode and extending beyond perimeters of the anode.

For example, the system 100 can receive a first substrate including a cathode at the irradiation station and irradiate the constellation of separator material droplets and the cathode with an electron beam to crosslink the first polymer (e.g., PVDF-HFP) and form a continuous non-conductive structure: defining a separator film with the open-celled network of pores sized to transport ions through the separator film; and extending beyond perimeters of the cathode. The system 100 can then receive a second substrate including an anode at the irradiation station and irradiate the constellation of separator material droplets and the anode with an electron beam to crosslink molecules within the first polymer (e.g., PVDF-HFP) and form a continuous non-conductive structure: defining a separator film with the open-celled network of pores sized to transport ions through the separator film; and extending beyond perimeters of the anode. Thus, after subsequent assembly of the anode and the cathode into a battery cell post-processing, the continuous non-conductive structure can prevent flow of electrons between the anode and the cathode such as to prevent electrical shorts in the battery cell.

Additionally or alternatively, the system 100 can irradiate the constellation of separator material droplets and the cathode and/or anode via an electron beam to crosslink the first polymer and form the separator film including a permeable separator membrane on the cathode and/or anode with the open-celled network of pores sized to transport ions through the permeable separator membrane.

Therefore, the system 100 can irradiate the constellation of separator material droplets after rapidly drying and washing the substrate to form a rigid, continuous non-conductive structure of uniform thickness on the substrate and thereby, form a thin film of separator material that exhibits a target mechanical, electrical, optical, and physical properties.

6. Post-Processing Battery Assembly: Solvated Ion Introduction

In one variation, the separator film can form a porous electrolyte structure extending beyond perimeters of the substrate (e.g., cathode, anode) during the last irradiating segment of the processing cycle. The system 100 can then expose the electrolyte structure to solvent (e.g., an organic solvent) and ions to fill the network of open-celled pores in the electrolyte structure with solvated ions, thereby forming an electrolyte. In this variation, the system 100 can introduce solvated ions (e.g., lithium ions) to the electrolyte structure in order to fill the network of open-celled pores and thus enable this electrolyte structure to function as an ion-carrying (e.g., a lithium-ion-carrying) electrolyte in a subsequently assembled battery cell for an electric vehicle or a wearable device.

Therefore, the system 100 can execute the processing cycle to form a porous electrolyte structure that extends beyond perimeters of an anode or a cathode and then fill the network of open-celled pores with solvated ions to form an electrolyte. Additionally, the electrolyte can function as a buffer or electrode separator between an anode and a cathode, subsequently assembled into a battery cell, in order to prevent flow of electrons between the anode and the cathode inside the battery cell (i.e., to prevent electrical shorts).

7. Variation: Spray Nozzles in Parallel

In one variation, the coating supply subsystem can include a set of spray nozzles coupled in parallel by a valve such that each spray nozzle in the set of spray nozzles can concurrently spray-coat separator material onto a substrate to achieve a separator film exhibiting a uniform target thickness across the substrate. In this variation, the valve can include a chemical resistant solenoid valve—resistant to the first solvent (e.g., butanone) in the polymer-polymer-solvent liquid mixture—operable in an open and closed position to maintain the vapor pressure of the polymer-polymer-solvent liquid mixture within each spray nozzle of the coating supply subsystem.

For example, the coating supply subsystem can include a set of (e.g., 3) spray nozzles: connected in parallel by the solenoid valve; defining a coating zone; and configured to concurrently spray-coat separator material onto a substrate within the coating zone. At a first time, the system 100 can: receive a first section of a substrate tape including a first substrate within the coating zone; spray-coat a first constellation of separator material droplets onto a first section of the first substrate via the first spray nozzle; spray-coat a second constellation of separator material droplets onto a second section of the first substrate via the second spray nozzle; and spray-coat a third constellation of separator material droplets onto a third section of the first substrate interposed between the first and second sections of the first substrate via the third spray nozzle.

At a second time succeeding the first time, the system 100 can implement methods and techniques described above to: heat the first substrate to a target substrate temperature to concurrently and rapidly dry the first, second, and third constellations of separator material droplets on the first substrate to evaporate the first solvent (e.g., butanone) out of the first, second, and third constellations of separator material droplets; wash the first, second, and third constellations of separator material droplets and the substrate with the second solvent (e.g., isopropanol) to dissolve the second polymer (e.g., PEG) from the first, second, and third constellations of separator material droplets in order to render an open-celled network of pores; and irradiate the first, second, and third constellations of separator material with an electron beam to crosslink the first polymer (e.g., PVDF-HFP) to form a separator material film extending beyond perimeters of the first substrate (e.g., encapsulating all sides of the first substrate). Thus, each spray nozzle in the coating supply subsystem can spray-coat a corresponding section of the substrate to achieve a separator film of uniform target thickness.

Additionally or alternatively, the coating supply subsystem can include the set of (e.g., 3) spray nozzles: connected in parallel by the solenoid valve; defining a set of (e.g., 3) coating zones; and configured to spray-coat separator material onto a corresponding substrate in a series of substrates within each coating zone. In this variation, the system 100 can concurrently batch process a series of substrates during the processing cycle.

For example, at a first time, the system 100 can: receive a first section of a substrate tape including a first substrate within a first coating zone; receive a second section of the substrate tape including a second substrate within a second coating zone; and receive a third section of a substrate tape including a third substrate within a third coating zone. At approximately the first time, the system 100 can: spray-coat a first constellation of separator material droplets over the first substrate via the first spray nozzle; spray-coat a second constellation of separator material droplets over the second substrate via the second spray nozzle; and spray-coat a third constellation of separator material droplets over the third substrate via the third spray nozzle. At a second time succeeding the first time, the system 100 can implement methods and techniques described above to: heat the first substrate, the second substrate, and the third substrate to a target substrate temperature to concurrently and rapidly dry the first, second, and third constellations of separator material droplets on the first, second, and third substrates to evaporate the first solvent (e.g., butanone) out of the first, second, and third constellations of separator material droplets; wash the first, second, and third constellations of separator material droplets and the first, second, and third substrates with the second solvent (e.g., isopropanol) to dissolve the second polymer (e.g., PEG) from the first, second, and third constellations of separator material droplets in order to render an open-celled network of pores on the first, second, and third substrates; and irradiate the first, second, and third constellations of separator material droplets with an electron beam to crosslink the first polymer (e.g., PVDF-HFP) to form a first separator material film extending beyond perimeters of the first substrate (e.g., encapsulating all sides of the first substrate), a second separator material film extending beyond perimeters of the second substrate, and a third separator material film extending beyond perimeters of the third substrate. Thus, each spray nozzle in the coating supply subsystem can spray-coat a corresponding substrate in a series of substrates to achieve a separator material film of uniform target thickness on the series of substrates in a batch coating process.

8. Other Separator Material Applications

Generally, the method S100 is described above for manufacturing a conformable, rigid separator film within a 2D or 3D lithium-ion battery for an electric vehicle, such as by manufacturing a separator film of uniform thickness onto a planar anode and then assembling a planar cathode over the separator film. However, similar methods and techniques can be implemented to produce a conformable, rigid separator film in the context of fabricating a 3D battery on a silicon wafer. Similarly, these methods, techniques, and materials can be implemented to produce a 2D or 3D hydrogen fuel cell containing a separator film that defines a controlled density and distribution of relatively large pores that enable improved hydrogen-ion conduction through the fuel cell. Furthermore, these methods, techniques, and materials can be implemented to produce a 2D or 3D nickel metal-hydride battery containing a separator film that defines a controlled density and distribution of relatively large pores that enable improved hydrogen-ion conduction through the nickel metal-hydride battery.

However, the separator material can be applied and processed in any other way to form a conformable, rigid separator film. Similarly, the method S100 can be implemented in any other way to fabricate a conformable, rigid separator film, such as directly over an electrode or separately from an electrode.

The systems and methods described herein can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

We claim:

1. A method for depositing separator material comprising:
during a first time period:
  receiving a first substrate in a coating zone;
  spray-coating a constellation of separator material droplets over the first substrate, each droplet in the constellation of separator material droplets comprising a first solvent, a first polymer miscible in the first solvent, and a second polymer miscible in the first solvent; and
  accessing a target substrate temperature less than a boiling point of the first solvent; and
during a second time period succeeding the first time period:
  heating the first substrate and the constellation of separator material droplets to the target substrate temperature to evaporate the first solvent out of the constellation of separator material droplets and promote phase-separation of the second polymer from the first polymer;
  washing the constellation of separator material droplets with a second solvent to dissolve the second polymer out of the constellation of separator material droplets and render an open-celled network of pores within the constellation of separator material droplets; and
  irradiating the constellation of separator material droplets and the first substrate to crosslink the first polymer and form a separator film on the first substrate, the separator film defining the open-celled network of pores sized to transport ions.

2. The method of claim 1:
further comprising, during the first time period:
  defining a target gas temperature range of the first solvent, the target gas temperature range corresponding to a target vapor pressure of separator material in the gaseous environment;
  at a vessel containing a gaseous environment of the first solvent above a reservoir of separator material in a liquid state, heating the gaseous environment toward the target gas temperature range; and
  detecting a second temperature of the gaseous environment; and
wherein spray-coating the constellation of separator material droplets over the first substrate comprises, in response to the second temperature of the separator material falling within the target gas temperature range, spray-coating the constellation of separator material droplets over the first substrate.

3. The method of claim 1:
further comprising, during the first time period:
  defining a target liquid temperature range of separator material;
  at a spray nozzle coupled to a reservoir of separator material in a liquid state and facing the first substrate, heating the spray nozzle toward the target liquid temperature range; and
  detecting a second temperature of separator material at the spray nozzle; and
wherein spray-coating the constellation of separator material droplets over the first substrate comprises, in response to the second temperature falling within the target liquid temperature range, spray-coating the constellation of separator material droplets over the first substrate via the spray nozzle.

4. The method of claim 3:
further comprising, during the first time period:
  receiving a target separator thickness for the separator film;
  selecting a target offset distance between the spray nozzle and the first substrate based on the target separator thickness;
  detecting a first distance between the spray nozzle and the first substrate within the coating zone; and
  in response to the target offset distance exceeding the first distance between the spray nozzle and the first substrate, adjusting the first distance to the target offset distance between the spray nozzle and the first substrate;
wherein spray-coating the constellation of separator material droplets over the first substrate comprises spray-coating the constellation of separator material droplets over the first substrate via the spray nozzle at the target offset distance; and
wherein irradiating the constellation of separator material droplets and the first substrate comprises irradiating the constellation of separator material droplets and the first substrate to crosslink the first polymer and form the separator film exhibiting a separator thickness approximating the target separator thickness.

5. The method of claim 1:
wherein receiving the first substrate comprises receiving the first substrate comprising a cathode within the coating zone;
wherein spray-coating the constellation of separator material droplets over the first substrate comprises spray-coating the constellation of separator material droplets over the cathode; and
wherein irradiating the constellation of separator material droplets and the first substrate comprises irradiating the constellation of separator material droplets and the cathode with an electron beam to crosslink the first polymer and form a continuous non-conductive structure:
  defining the separator film with the open-celled network of pores sized to transport ions through the separator film; and
  extending beyond perimeters of the cathode.

6. The method of claim 1:
wherein receiving the first substrate comprises receiving the first substrate comprising an anode within the coating zone;
wherein spray-coating the constellation of separator material droplets over the first substrate comprises spray-coating the constellation of separator material droplets over the anode; and
wherein irradiating the constellation of separator material droplets and the first substrate comprises irradiating the constellation of separator material droplets and the anode with an electron beam to crosslink the first polymer and form a continuous non-conductive structure:
  defining the separator film with the open-celled network of pores sized to transport ions through the separator film; and
  extending beyond perimeters of the anode.

7. The method of claim 1:
further comprising, during the first time period, defining a target separator thickness corresponding to a target conductivity of the separator film; and
wherein irradiating the constellation of separator material droplets and the first substrate to crosslink the first polymer and form the separator film comprises irradiating the constellation of separator material droplets and the first substrate to crosslink the first polymer and form the separator film with a separator thickness approximating the target separator thickness.

8. The method of claim 1:
further comprising, during the first time period, receiving a target separator thickness for the separator film;
wherein spray-coating the constellation of separator material droplets comprises, at a first spray nozzle coupled to a reservoir of separator material in a liquid state and facing the first substrate, spray-coating the constellation of separator material droplets over the first substrate;
further comprising, during the second time period at a second spray nozzle coupled to the reservoir of separator material, spray-coating a second constellation of separator material droplets over the first substrate, each droplet in the second constellation of separator material droplets comprising the first solvent, the first polymer, and the second polymer; and
wherein irradiating the constellation of separator material droplets and the first substrate to crosslink the first polymer and form the separator film comprises irradiating the constellation of separator material droplets, the second constellation of separator material droplets, and the first substrate to crosslink the first polymer and form the separator film with a separator thickness approximating the target separator thickness.

9. The method of claim 1:
wherein spray-coating the constellation of separator material droplets over the first substrate comprises spray-coating the constellation of separator material droplets over the first substrate, each droplet in the constellation of separator material droplets comprising:
  the first solvent comprising a first volume of an organic ketone solvent;
  the first polymer miscible in the first volume of the organic ketone solvent and comprising a second volume of a co-polymer; and
  the second polymer miscible in the first volume of the organic ketone solvent and comprising a third volume of a polyether;
wherein accessing the target substrate temperature comprises accessing the target substrate temperature less than the boiling point of the organic ketone solvent; and
wherein heating the first substrate and the constellation of separator material droplets to the target substrate temperature to evaporate the first solvent comprises heating the first substrate and the constellation of separator material droplets to the target substrate temperature to dissolve the first volume of organic ketone solvent out of the constellation of separator material droplets and promote phase-separation of the second polymer from the first polymer.

10. The method of claim 9, wherein washing the constellation of separator material droplets with the second solvent comprises washing the constellation of separator material droplets with the second solvent comprising a fourth volume of an alcohol to dissolve the third volume of the polyether out of the constellation of separator material droplets and render the open-celled network of pores within the constellation of separator material droplets.

11. The method of claim 1, wherein spray-coating the constellation of separator material droplets over the first substrate comprises spray-coating the constellation of separator material droplets over the first substrate, each droplet in the constellation of separator material droplets containing molecules of the first polymer defining a minor cross-sectional width:
  greater than a minimum cross-sectional width of lithium ions; and
  less than a minimum cross-sectional width of a substrate thickness.

12. The method of claim 1:
wherein receiving the first substrate within the coating zone comprises receiving a first section of a substrate tape comprising the first substrate within the coating zone;
further comprising, during a third time period succeeding the first time period:
  receiving a second section of the substrate tape comprising a second substrate within the coating zone; and
  spray-coating a second constellation of separator material droplets over the second substrate, each droplet in the second constellation of separator material droplets comprising the first solvent, the first polymer miscible in the first solvent, and the second polymer miscible in the first solvent; and
further comprising, during a fourth time period succeeding the third time period:
  heating the second substrate and the second constellation of separator material droplets to the target substrate temperature to evaporate the first solvent out of the second constellation of separator material droplets and promote phase-separation of the second polymer from the first polymer;
  washing the constellation of separator material droplets with a second solvent to dissolve the second polymer out of the second constellation of separator material droplets and render the open-celled network of pores within the second constellation of separator material droplets; and
  irradiating the second constellation of separator material droplets and the second substrate to crosslink the first polymer and form a second separator film on the second substrate with a separator thickness approximating a target separator thickness.

13. The method of claim 1, wherein irradiating the constellation of separator material droplets and the first substrate comprises irradiating the constellation of separator material droplets and the first substrate via an electron beam to crosslink the first polymer and form the separator film comprising a permeable separator membrane on the first substrate with the open-celled network of pores sized to transport ions through the permeable separator membrane.

14. The method of claim 1, wherein dissolving the second polymer out of the constellation of separator material droplets comprises:
  rinsing the constellation of separator material droplets and the first substrate with the second solvent to render an open-celled network of pores; and
  projecting a stream of air over the constellation of separator material droplets and the first substrate to remove the second solvent from the constellation of separator material droplets and the first substrate.

15. The method of claim 1, wherein spray-coating the constellation of separator material droplets over the first substrate comprises spray-coating the constellation of separator material droplets over the first substrate, each droplet in the constellation of separator material droplets comprising between 15% and 20% by weight of the first solvent comprising an organic ketone.

16. A method for depositing separator material comprising:
  during a first time period:
    receiving a substrate within a coating zone;
    defining a target liquid temperature range of separator material;
    at a spray nozzle facing the substrate and coupled to a reservoir of separator material in a liquid state, heating the spray nozzle toward the target liquid temperature range;
    detecting a first temperature of separator material at the spray nozzle;
    in response to the first temperature of the separator material falling within the target liquid temperature range, spray-coating a first volume of separator material comprising a first solvent, a first polymer miscible in the first solvent, and a second polymer miscible in the first solvent over the substrate via the spray nozzle; and
    accessing a target substrate temperature less than a boiling point of the first solvent; and
  during a second time period succeeding the first time period:
    heating the substrate and the first volume of the separator material to the target substrate temperature to evaporate the first solvent out of the volume of separator material;
    dissolving the second polymer out of the first volume of separator material to render an open-celled network of pores; and
    irradiating the first volume of separator material to crosslink the first polymer and form a separator film with a separator thickness approximating a target separator thickness.

17. The method of claim 16:
  further comprising, during the first time period:
    defining a target gas temperature range of separator material, the target gas temperature corresponding to a target vapor pressure of separator material in a gas state;
    at a vessel containing a gaseous environment above the reservoir of separator material in the liquid state, heating the gaseous environment toward the target gas temperature range; and
    detecting a second temperature of the gaseous environment; and
  wherein spray-coating the volume of separator material over the substrate comprises, in response to the first temperature of the separator material falling within the target liquid temperature range and in response to the second temperature of the separator material falling within the target gas temperature range, spray-coating the first volume of separator material over the first substrate via the spray nozzle.

18. The method of claim 16, further comprising:
  during the first time period, detecting a minimum volume of separator material in the liquid state in the reservoir; and
  during a third time period succeeding the second time period:
    receiving a second substrate within the coating zone;
    heating the spray nozzle toward the target liquid temperature range;
    detecting a second temperature of separator material at the spray nozzle;
    in response to the second temperature of the separator material falling within the target liquid temperature range, spray-coating a second volume of separator material comprising the first solvent, the first polymer, and the second polymer over the second substrate via the spray nozzle;
    calculating a total volume of separator material on the first substrate and the second substrate based on a combination of the first volume of separator material and the second volume of separator material; and
    in response to the total volume of separator material exceeding the minimum volume of separator material, refilling the reservoir with a third volume of separator material in the liquid state greater than the minimum volume of separator material.

19. A method for depositing separator material comprising:
  during a first time period:
    receiving a section of a substrate tape comprising a first substrate within a coating zone; and
    depositing a constellation of separator material droplets over the first substrate, each droplet in the constellation of separator material droplets comprising a first solvent, a first polymer, and a second polymer; and
  during a second time period succeeding the first time period:
    heating the first substrate and the constellation of separator material droplets to a first temperature;
    washing the constellation of separator material droplets and the first substrate with a second solvent to dissolve the second polymer out of the constellation of separator material droplets and render an open-celled network of pores within the constellation of separator material droplets; and
    irradiating the constellation of separator material droplets to crosslink the first polymer and form a discrete separator layer on the first substrate, the discrete separator layer defining the open-celled network of pores sized to transport ions through the discrete separator layer.

20. The method of claim 19, wherein depositing the constellation of separator material droplets over the first substrate comprises spray-coating the constellation of monodispersed separator material droplets over the first substrate, each droplet in the constellation of separator material droplets sized to prevent defect formation in the discrete separator layer on the first substrate.

* * * * *